Figure 1:
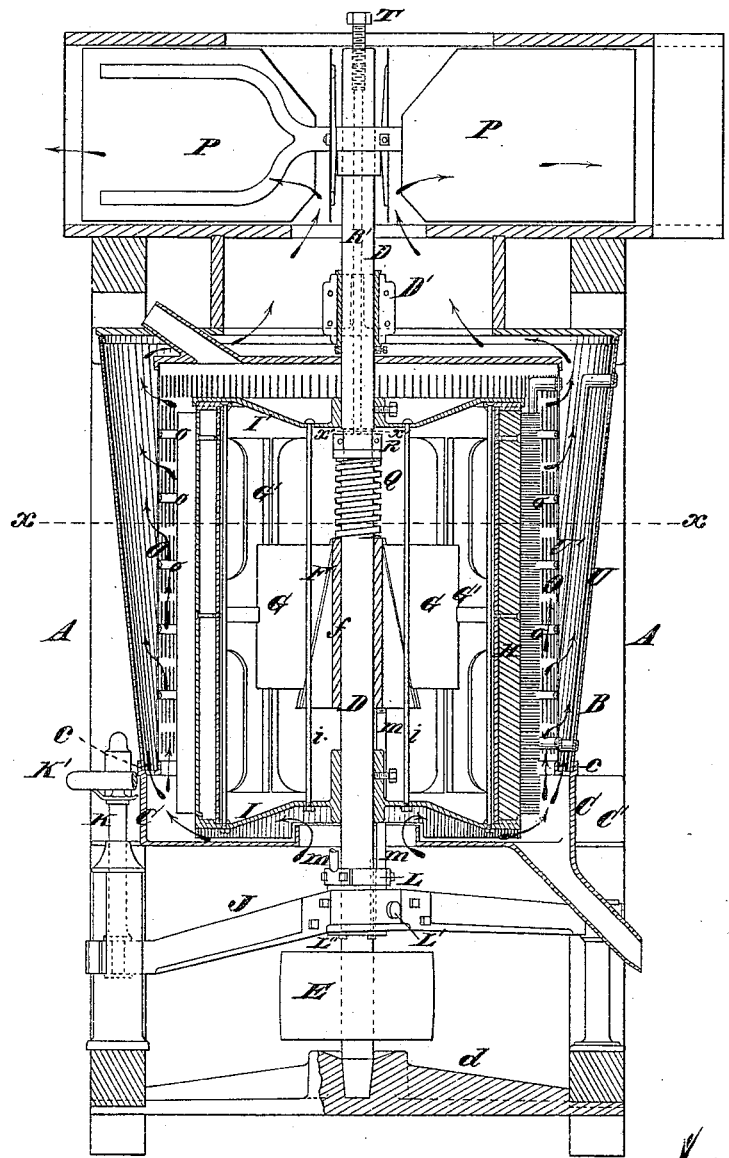

(No Model.) 2 Sheets—Sheet 1.

H. P. EDMANDS.
SMUT AND POLISHING MACHINE FOR PREPARING WHEAT, &c.

No. 248,724. Patented Oct. 25, 1881.

Attest
Jno. L. Jones
Eugene L. Frukous

Inventor
Hiram P. Edmands
by Wood & Boyd,
his Attorneys &c.

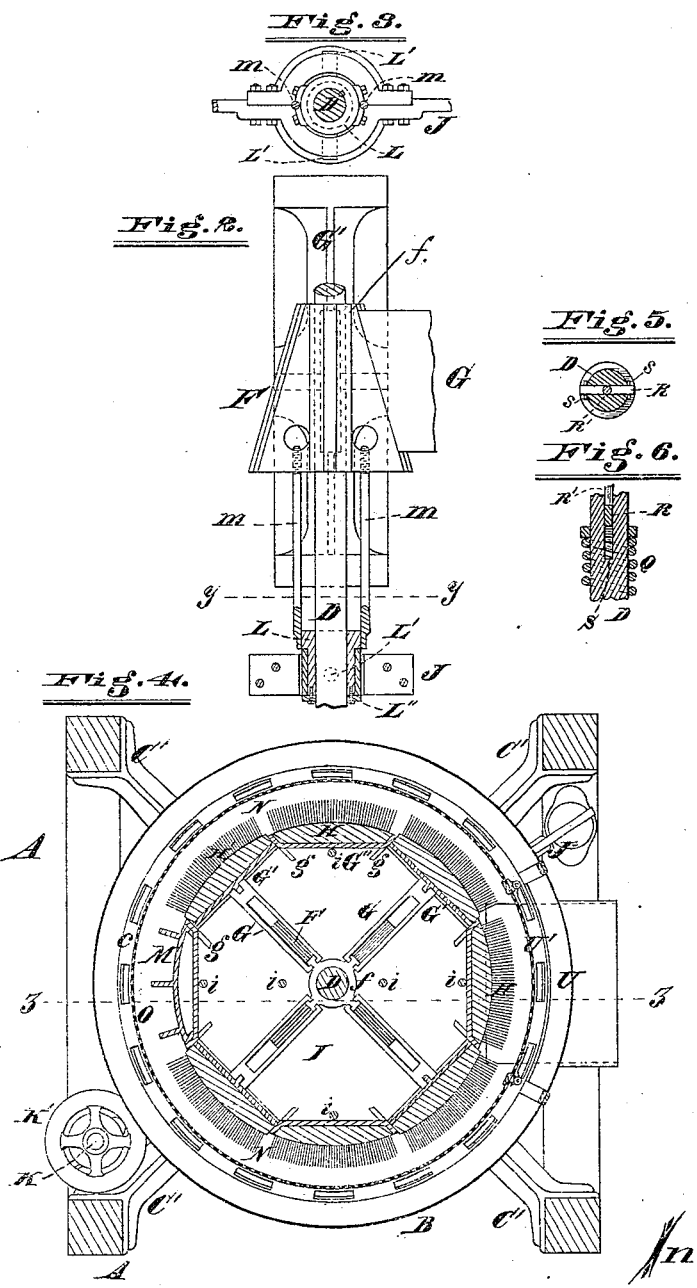

UNITED STATES PATENT OFFICE.

HIRAM P. EDMANDS, OF COVINGTON, KENTUCKY, ASSIGNOR OF ONE-THIRD TO F. C. HIENSAITH, OF CINCINNATI, OHIO.

SMUT AND POLISHING MACHINE FOR PREPARING WHEAT, &c.

SPECIFICATION forming part of Letters Patent No. 248,724, dated October 25, 1881.

Application filed March 9, 1881. (No model.)

*To all whom it may concern:*

Be it known that I, HIRAM P. EDMANDS, a citizen of the United States, of Covington, in the county of Kenton and State of Kentucky, have invented certain new and useful Improvements in Smut and Polishing Machines for Preparing Wheat and other Grain for Grinding, of which the following is a specification.

My invention relates to improvements in smut and polishing machines for preparing wheat and other grain for grinding, and relates to that class of machines which employ vertical brushes revolving within a perforated case, around which an air-blast is employed to carry away impurities removed by the operation of the machine.

The object of my invention is, first, to provide suitable means for adjusting the brush radially while in motion within the cylindrical casing, so that the space between the brush and the cylinder can be increased or diminished, thereby adapting the machine to all kinds of grain.

Another object of the invention is to adapt the machine for polishing the grain or to beat and polish it simultaneously. These objects I accomplish by the construction and arrangement of mechanism illustrated in the accompanying drawings, in which—

Figure 1 is a sectional elevation of my invention on line $zz$, Fig. 4. Fig. 2 is a broken elevation, partly in section, showing the back of one of the brushes and the expanding devices on the shaft. Fig. 3 is a broken sectional plan on line $yy$, Fig. 2. Fig. 4 is a sectional plan on line $xx$, Fig. 1. Fig. 5 is a sectional plan on line $x'x'$, Fig. 1. Fig. 6 is a vertical cross-section of the same, showing the shaft broken.

A A represent the frame of the machine.

B represents the curb or outer shell of the machine, preferably made of sheet-iron and slightly conical, as shown in Fig. 1.

C represents a hoop provided with arms C', which are rigidly attached to posts A.

$c$ represents an annular groove, formed on top of band C, in which the curb B rests. This is the preferred form.

D represents the shaft, which is journaled at its top end in a bearing, D', and at the bottom it is stepped in the bridge-tree $d$.

E represents an ordinary driving-pulley.

F represents a spider, which is preferably made of cast-iron. It consists of a sleeve, $f$, and is shown as having four arms of a conical form, tapering from the bottom upward. These arms are T shape in cross-section, as shown in Fig. 4, and form grooves to sustain and support the movable wings G, which are open parallelograms in cross-section, and their inner edges are inclined conversely to the wings F and slotted from top to bottom to engage over the T-heads of the spider-arms F, as shown in Fig. 4. To these movable wings are rigidly attached brush-heads G', which are preferably made of iron, and may, if desired, be cast solid with the wings G.

G" represents sections connected to sections G', to which detachable brushes H are connected by screw-bolts or other adjusting devices.

H' represent brushes, which are attached to radially-adjustable brush-heads G'.

I I' represent cylinder-heads, which are provided with fillets $gg$. The stationary sections G" form pillars or supports, against the ends of which the cylinder-heads are securely clamped by means of stay-rods $i$.

The radially-adjustable brush-heads G' are made slightly shorter than the stationary sections G" and move radially out and in between the fillets $g$.

J represents a lighter bar, which is pivoted at one end to post A and suspended at the other end upon the adjusting screw-rod K.

L represents a sleeve sliding freely on shaft or spindle D.

L' represents a gimbal for connecting the lighter bar J to the sliding sleeve L.

$m$ represents rods securely attached at their lower ends to the sliding sleeve L. They project upward, and are tapped into the conical spider-arms F. By turning hand-wheel K' on the screw K the lighter bar J with the sliding sleeve L, rods $m$, and conical arms F are raised and lowered vertically. As the spider-arms F are raised the wings G, the brush-heads G', and brushes H' are projected radially outward, and a reverse motion of the screw adjusts them in an opposite direction.

N represents spaces between the brushes H H', which form air-flues, which serve to prevent the clogging of the brushes and to facilitate the escape of the smut, fuzz, and germ removed by the process of scouring and polishing.

O represents the ordinary perforated casing, within which the brush devices revolve.

o represents rings rigidly secured at suitable distances apart on the inside of perforated casing O, as shown in Fig. 1, to prevent the too rapid downward passage of the grain and hold it in temporary suspension during the action of the air-blast and operation of the brushes.

P represents an ordinary suction-fan, mounted in the usual manner, to produce a current of air for partially holding the grain in suspension during the action of scouring or polishing. The arrows indicate the currents of air passing through the machine in the ordinary manner.

On account of the conical shape of the arms F and the radial adjustability of the wings G the centrifugal force tends to lift the rapidly-revolving arms F and cause an undue upward strain of the collar L'', which holds the sleeve L against the boxing on the lighter bar J, and prevent the independent movement of the parts. To compensate against this friction a tension-spring, Q, is constructed and arranged in the following manner:

S represents a slot or mortise cut transversely through the shaft.

R represents a fid, which is inserted through the slot and kept from lateral movement by the pins s. The shaft D above the slot S is cored or bored out. In the bore of this shaft a rod, R', is inserted and securely attached to the fid R. The upper end is provided with female screw-threads, in which engage an adjusting-screw, T. As the screw T is turned downward the fid R presses downward upon the spring Q, and increases its tension and prevents the tendency of the upward crowding of the sleeve f.

In the ordinary use of this machine as a scourer the alternate series of the brushes H are removed from the brush-heads G'', and the cylinder is formed of alternate cylindrical segments M and brushes H'. To facilitate the removal of these brushes a man-hole, U, is provided in the curb B, and a similar one, U', in the perforated screen O. Suitable plates or doors are provided to close these man holes when the machine is to be operated.

It is evident that the adjustable spring Q might be placed upon the shaft below the sleeve f on the shaft D, or between the cylinder-head and some point below; but the form herein shown I deem the best.

I am aware that a machine for dusting bran has been constructed in which the rotary vertical shaft is provided with a movable collar having arms inclined at their edges, to which are connected the inclined edges of plates carrying brushes for forcing the ground meal through a perforated casing, said movable collar being adjustable by means of a nut and screw for adjusting the brushes radially; but in such machines the collar and inclined arms can only be adjusted by stopping the operation of the machine and gaining access to the interior of the machine.

In my invention the sliding sleeve and spider-arms, for moving the brushes radially, are placed under perfect control of the attendant, and the space between the brushes and the surrounding casing can be changed at any time during the operation of the machine.

I claim—

1. In a smut and polishing machine for wheat, the sliding sleeve f, arranged on the rotary shaft D, and provided with the inclined spider-arms, and the inclined wings G, carrying brushes and movably connected with the spider-arms, in combination with mechanism connected with the sliding sleeve, and under control of the attendant from the exterior of the machine, whereby the sleeve can be moved vertically on the rotating shaft to radially adjust the brushes at any time during the operation of the machine.

2. In a smut and polishing machine for wheat, the sleeve f, having the inclined spider-arms F, and the inclined arms G, carrying brushes and movably connected with the spider-arms, in combination with the pivoted lighter-bar J, connected with the sleeve f, and devices for adjusting said lighter-bar, whereby the sleeve can be automatically moved vertically to readily adjust the brushes at any time during the operation of the machine, substantially as described.

3. In a smut and polishing machine for wheat, the sleeve f, having the inclined spider-arms F, and the inclined arms G, carrying brushes and movably connected with the spider-arms, in combination with the pivoted lighter-bar J, provided with the sleeve L, having vertical rods m, rigidly connected with the sleeve of the spider-arms, and the hand-screw K for adjusting the lighter-bar, whereby the spider-arms can be moved vertically to radially adjust the brushes at any time during the operation of the machine.

4. The combination, with the sleeve f, having the inclined spider-arms F, movably connected with the brush-carrying wings G, of the shaft D, slotted at S, and tubular above the slot, the spring Q, encircling the shaft, the transverse fid R, and the rod R', and screw T, for adjusting the fid, substantially as described.

5. In a smut and polishing machine, the series of permanent-spaced brushes H', and a series of interchangeable flanged beater-sections, M, and brush-sections H, adapting the machine to be converted from a polishing to a combined polishing and beating machine, substantially as described.

6. In a wheat scourer and polisher, the revolving cylindrical series of brushes H', provided with air-spaces N, formed between the series of brushes, and the brush-heads G', mounted upon the radially and vertically adjustable wings F G, and revolving within the perforated screen O, the whole being combined substantially as and for the purpose described.

In testimony whereof I have hereunto set my hand in the presence of two subscribing witnesses.

HIRAM P. EDMANDS.

Witnesses:
J. H. CHARLES SMITH,
EUGENE L. FUNKOESS.